United States Patent [19]

Kaufman

[11] 4,231,623
[45] Nov. 4, 1980

[54] STEEL CONNECTING ROD BEARING LINER FOR INTERNAL COMBUSTION ENGINES

[75] Inventor: Vernon R. Kaufman, Cedarburg, Wis.

[73] Assignee: Tecumseh Products Company, Tecumseh, Mich.

[21] Appl. No.: 947,517

[22] Filed: Oct. 2, 1978

[51] Int. Cl.³ .............................................. F16C 13/14
[52] U.S. Cl. ....................................... 308/23; 308/240
[58] Field of Search .................. 308/23, 179, DIG. 8, 308/237 R, 241, DIG. 4, 216, 206, 207 R, 240, 78

[56] References Cited

U.S. PATENT DOCUMENTS

| 757,115 | 4/1904 | Hoshor | 308/206 |
|---|---|---|---|
| 1,500,902 | 7/1924 | Sewell | 308/207 R |
| 1,821,873 | 9/1931 | Best | 308/179 |
| 2,624,645 | 1/1953 | Virtue | 308/216 |
| 2,914,038 | 11/1959 | McKellar | 308/23 |
| 3,244,463 | 4/1966 | Bowen et al. | 308/179 |
| 3,641,990 | 2/1972 | Kinnersly | 308/23 |
| 4,097,759 | 6/1978 | Furbee et al. | 308/241 |
| 4,114,961 | 9/1978 | Pithie | 308/237 R |
| 4,123,122 | 10/1978 | Gabrielson et al. | 308/DIG. 8 |

Primary Examiner—Lenard A. Footland
Attorney, Agent, or Firm—Albert L. Jeffers; John F. Hoffman

[57] ABSTRACT

A split steel connecting rod bearing liner for internal combustion engines comprising two generally semicircular liner halves formed of steel having inner bearing surfaces which are hardened and including a generally semicircular peripheral reinforcing groove formed in each of the halves. The grooves each comprise a peripheral depression in the inner surface and a corresponding peripheral ridge on the outer surface directly opposite the depression and may be formed by stamping or another suitable metal forming operation. The connecting rod includes a circumferential groove in the crank pin opening within which the liner grooves are disposed so as to prevent lateral movement of the liner.

13 Claims, 8 Drawing Figures

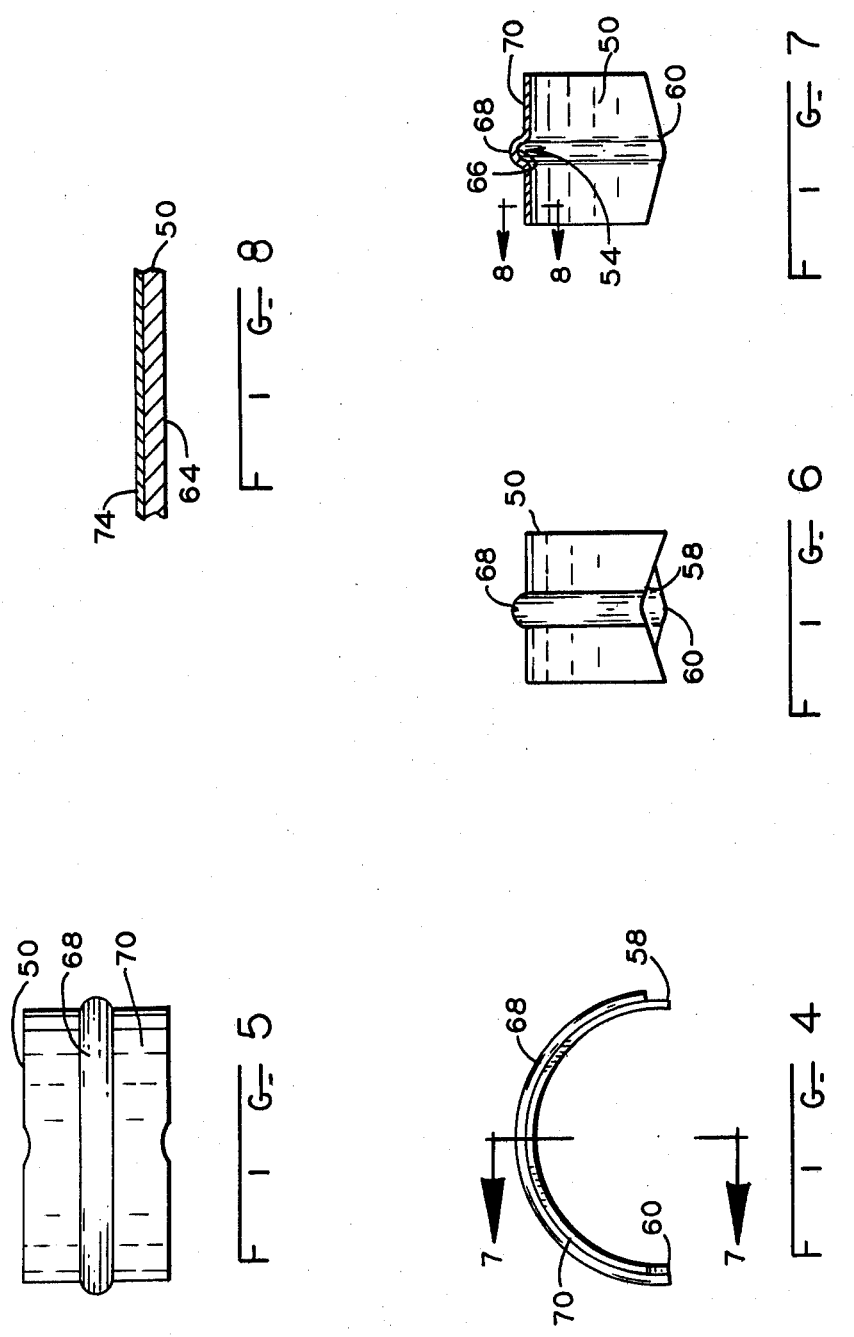

STEEL CONNECTING ROD BEARING LINER FOR INTERNAL COMBUSTION ENGINES

BACKGROUND OF THE INVENTION

The present invention relates to a connecting rod bearing liner and in particular to a split liner which is devoid of reinforcing and centering side flanges.

In order to provide a suitable bearing surface between the crankshaft and a connecting rod made of aluminum or other metal of insufficient hardness, it is common practice to employ hardned steel connecting rod liners. These liners are mounted to the connecting rod within the crank pin opening and serve as the outer race for the needle bearings or roller bearings.

Presently, connecting rod bearing liners are manufactured from steel formed in a semicircular shape and heat treated to produce the desired degree of hardness. The liners may be formed with or without side flanges, the latter serving both to provide a certain degree of reinforcement and to assist in maintaining the liner centered within the connecting rod. An example of a prior art liner having side flanges is found in U.S. Pat. No. 3,244,463.

Prior art liners without side flanges have very little strength so that maintaining an arc within proper tolerances is very difficult during forming and heat treating. Furthermore, the absence of axial locating means necessitates that careful attention during assembly be paid to ensure that the liners are properly centered relative to the connecting rod and cap. If not properly centered, the edge of the liner will contact the crankpin thrust face thereby resulting in rapid wear and high localized temperatures which will reduce the hardness of the raceway and initiate a progressive type failure.

Prior art liners with side flanges, although possessed with inherent centering capabilities and greater strength, are difficult to form without thinning, stretching and wrinkling the raceway and flanges. Due to the irregular surface of the flanges, they may develop high localized temperatures when contacting the thrust face of the crankpin so as to reduce the hardness of the flange and initiate a progressive type failure. The flange is not in intimate contact with the aluminum connecting rod so that the path of thermal flow is through the liner raceway to the connecting rod. This increases the operating temperature of the liner, rollers and crankpin which reduces or destroys the effectiveness of lubrication, thereby inducing failure. Similar metals and degrees of hardness are capable of being used effectively where rolling motion is involved, for example, in the case of roller bearings or needle bearings, but where sliding motion exists, it is desirable to have dissimilar metals with significant hardness differences.

In order to avoid the high localized flange temperatures discussed above, dry film lubricants may be required to provide relief during the initial breaking in period. When severe problems are encountered, bronze or silver plating may be required on the flanges to provide a better bearing surface through the use of dissimilar metals.

In manufacturing the flanged liner, it is common practice to plate one side of the steel strip with a metal die lubricant, such as copper, especially when forming the side flanges. When using normal metal forming techniques to form the liner halves and flanges, the bearing side of the raceway and flanges are the sides which are copper plated. In order to harden the bearing side of the raceway, the copper must be removed prior to heat treatment.

A further problem connected with manufacturing prior art liners is that the thickness of the steel and the fact that the heat treatment affects both sides render it difficult to maintain a ductile core.

SUMMARY OF THE INVENTION

The present invention overcomes the above-discussed disadvantages of prior art connecting rod bearing liners in that the liner is formed without side flanges and includes a circumferential reinforcing groove formed therein, which is disposed within a corresponding circumferential groove in the bore of the connecting rod. Because the raised side of the groove is formed on the outside of the liner, the copper plating, which serves as a die lubricant during forming, need not be removed prior to heat treating. Moreover, it is advantageous to permit the copper plating to remain on the outer surface during heat treating since this results in a more ductile liner core.

Specifically, the present invention comprises the combination of a connecting rod having a circular crankpin opening in one end thereof, a circumferential groove in the connecting rod within the opening, an annular liner circumferentially received in the opening having an outer side in tight engagement with the opening, a groove circumferentially formed in the liner in the form of a circumferential depression in the liner inner side and a circumferential ridge on the liner outer side, wherein the ridge is disposed within the connecting rod groove.

The method of making such a connecting rod bearing liner according to the present invention comprises the steps of plating one side only of a strip of steel with a lubricating metal such as copper, deforming the strip to a semicircular shape having a peripheral groove extending from one end of the strip to the other such that the plated side is convex and the groove forms a ridge on the plated side and a depression on the unplated side, and, without removing the copper plating, hardening the unplated side.

The liner according to the present invention eliminates many of the processing problems inherent in the two types of prior art liners discussed above. The circumferential groove is easily formed thereby resulting in less internal stresses caused by forming. Because the rigidity of the liner is increased through the entire arc of the liner by virtue of the circumferential groove formed therein, handling prior to and during heat treatment is facilitated and the resultant lower forming stresses reduce distortion during heat treatment.

The liner is located axially within the connecting rod so that its edges will not contact the crankpin thrust faces. This ensures that the axial thrust of the connecting rod will result in contact between the aluminum connecting rod face and the steel crankpin thrust face which, as is known, provides a material combination having good sliding bearing properties. The steel liner in combination with the good heat transfer properties of aluminun results in lower operating temperatures so that lubrication is improved thereby resulting in longer life. Furthermore, the center groove provides a lubrication reservoir.

Because the copper plating is allowed to remain during heat treating so as to mask the side opposite the raceway, only the bearing portion of the liner will be hardened. A substantial portion of thickness of the liner will remain virtually unaffected by the heat treatment so as to remain ductile thereby providing greater latitude in case depth tolerances. It will be recalled that in prior art designs, the copper plating is required on the inner bearing surface and must be removed so as to not mask this surface during heat treatment.

It is an object of the present invention to provide a durable and inexpensively manufactured liner for use in die cast or forged aluminum connecting rods which includes means for ensuring accurate locating thereof within the connecting rod.

A further object of the present invention is to provide a method for manufacturing such a connecting rod bearing liner wherein the raceway only is hardened thereby resulting in a liner which has greater overall ductility.

These and other objects and features of the present invention will be apparent from the detailed description considered together with the drawings.

BRIEF DESCRIPTION OF THE DRAWINGS

FIG. 4 is an elevational view of one of the liner halves;

FIG. 5 is a plan view of the liner half shown in FIG. 4;

FIG. 6 is an end view of the liner half shown in FIG. 4 viewed from the right end thereof; and FIG. 7 is a sectional view taken along line 7—7 of FIG. 4; and FIG. 8 is a sectional view taken along line 8—8 of FIG. 7.

DETAILED DESCRIPTION

Figure 1:
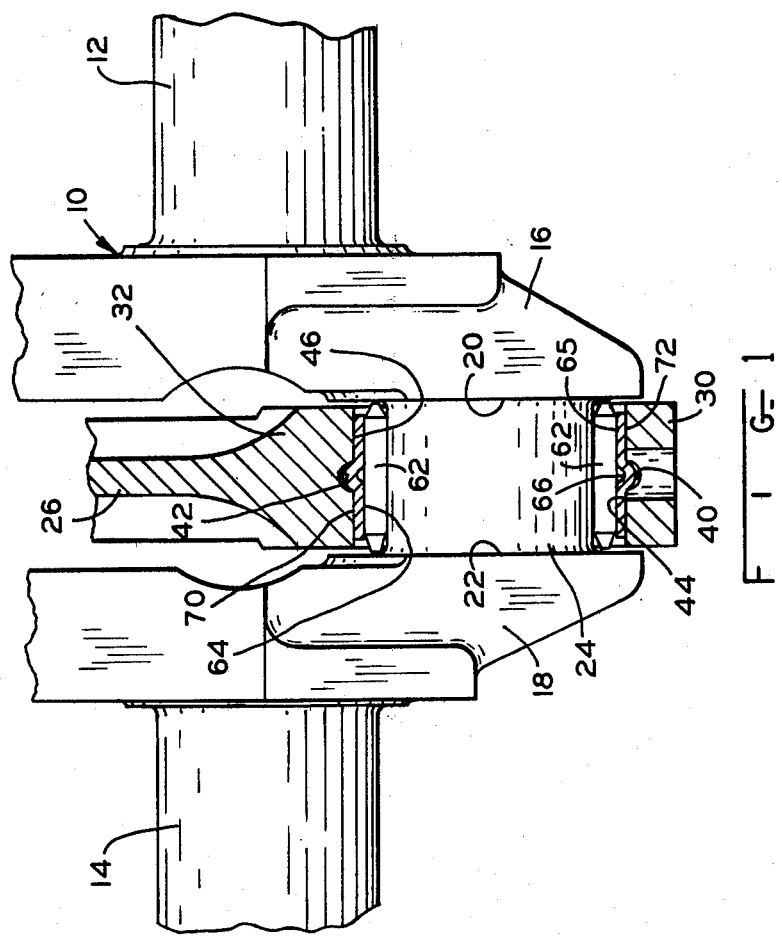
FIG. 1 is a partially sectioned fragmentary elevational view of a crankshaft and connecting rod assembly including the connecting rod and liner combination according to the present invention.

Referring now to the drawings and in particular to FIG. 1, there is illustrated a conventional crank shaft 10 comprising main journals 12 and 14, crank arms 16 and 18 having thrust faces respectively, and crankpin 24. Connecting rod 26 includes a crank end 28 of the split variety having a cap 30 which is secured to portion 32 integral with the major portion of connecting rod 26 by means of screws 34 and 36. Integral portion 32 and cap 30 each include generally semicircular open areas which together form a circular opening 38. Semicircular grooves 40 and 42 are formed in inner surfaces 44 and 46 of cap 30 and integral portion 32, respectively. Grooves 40 and 42 are preferably located along the center line of connecting rod 26 as viewed in FIGS. 1 and 2.

Figure 2:
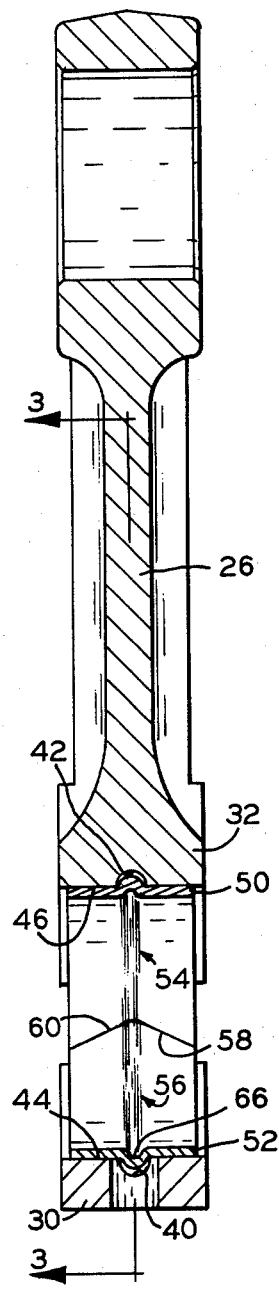
FIG. 2 is a longitudinal sectional view of the connecting rod and liner.

Connecting rod bearing liner 48 is formed of two generally semicircular liner halves 50 and 52 preferably of a suitable low carbon steel. Circumferential grooves 54 and 56 (FIG. 2) are formed in liner halves 50 and 52, respectively, along their center lines and extend from one end of the respective liners to the other so as to form a continuous circumferential groove when the liner halves 50 and 52 are assembled. As best illustrated in FIGS. 2, 4 and 6, liner halves 50 and 52 are provided with V-shaped notches 58 on one end and corresponding V-shaped points 60 on the other end so as to provide an interlocking assembly.

Figure 3:
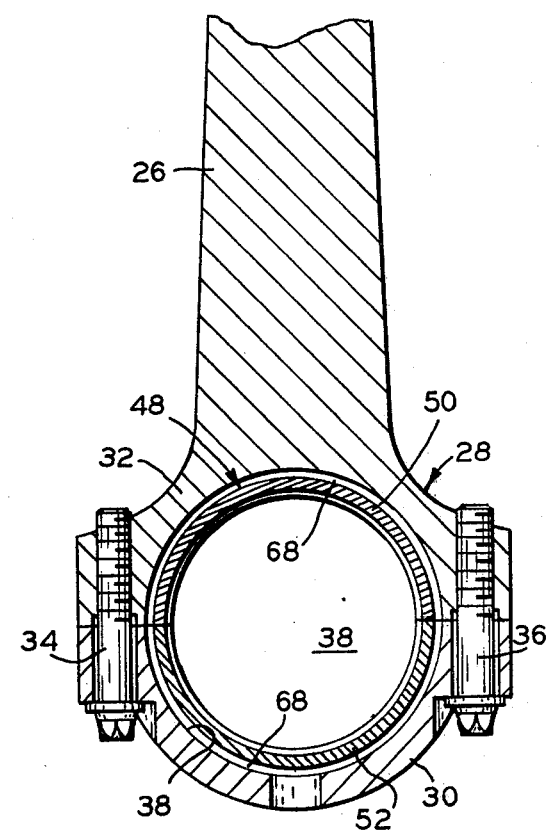
FIG. 3 is a sectional view taken along line 3—3 of FIG. 2.

Referring again to FIGS. 1, 2 and 3, liner halves 50 and 52 are mounted within connecting rod opening 38 such that their grooves 54 and 56 are received within the circumferential groove formed by groove 40 in cap 30 and groove 42 in integral portion 32. This ensures that liner 48 will not shift axially and contact crankshaft thrust faces 20 and 22. Needle bearings 62 are positioned between crankpin 24 and the inner bearing surface 64 of connecting rod liner 48. It will be noted that the circumferential depression 66 of groove 54–56 forms a lubricant reservoir. The opposite side of groove 54–56 forms a circumferential ridge 68. Groove 40–42 in connecting rod 26 may be machined or cast, as desired. Liner 48 is preferably dimensioned so as to be completely contained within connecting rod opening 38 thereby eliminating the possibility of contact between it and the crankshaft thrust faces 20 and 22.

Liner 48 is formed by first plating a strip or sheet of cold rolled low carbon steel such as 1008 or 1010 steel, which is a non-hardenable grade. Although copper plating is preferred, plating or coating with any suitable lubricating and masking metal or other material is also contemplated by the present invention. The coating or plating is accomplished on only one side 70 (FIGS. 4, 5 and 7).

The strip is formed, either simultaneously with the blanking operation or subsequently thereto, by a conventional stamping operation to produce the generally semicircular shape best illustrated in FIG. 4. Grooves 54 and 56 may be formed simultaneously with this step or, alternatively, in a subsequent stamping operation. It should be noted that the present invention is not restricted to a particular metal forming operation for producing grooves 54 and 56 and the generally semicircular shape of the liner halves 50 and 52.

At this point, liner halves 50 and 52 have convex outer sides 70 and 72 and concave inner sides 64 and 65, with the outer sides 70 and 72 being copper plated. Liner halves 50 and 52 are then subjected to a carbon rich environment at elevated temperatures, such as carbonizing, cyaniding, or carbonitriding. The carbon penetrates the surfaces not masked by copper thereby leaving a carbon rich hardenable surface, the depth of which is controlled by the time of exposure in the carbon rich environment. Liner halves 50 and 52 are then subjected to a suitable heat treating operation which may comprise the steps of raising the temperature thereof above the critical temperature and then rapidly quenching to produce the desired degree of hardness. Because the copper plating 74 (the thickness of which is exaggerated is FIG. 8) on the outer surfaces 70 and 72 prevents carbon penetration, inner surfaces 64 and 65 will reach a higher degree of hardness than will the inner portions of the liner halves 50 and 52. This results in a more ductile liner which permits greater latitude in case depth tolerances. If desired, the hardened liner halves 50 and 52 may be tempered.

While this invention has been described in terms of a preferred embodiment, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the limits of the appended claims.

What is claimed is:

1. In combination:
 a connecting rod having a circular crankpin opening in one end thereof,
 a circumferential groove in said connecting rod within said opening,
 an annular liner circumferentially received in said opening, said liner having an outer side in tight engagement with said opening, an inner side opposite said outer side, and side edges which are generally coextensive with said inner and outer sides circumferentially around said liner, and
 a groove circumferentially formed in said liner and being spaced inwardly from said side edges, said liner groove being in the form of a circumferential depression in said liner inner side and a circumferential ridge on said liner outer side, said ridge being disposed within said first-mentioned groove, said liner comprising side flange portions extending between said groove and said side edges, said side flange portions being substantially flat in the axial direction such that said groove forms a discontinuity within said liner intermediate said side edges.

2. The combination of claim 1 wherein said liner comprises two generally semicircular halves formed of steel having inner surfaces which are hardened.

3. The combination of claim 2 wherein said connecting rod one end is formed of two portions which are separable.

4. The combination of claim 1 wherein said liner groove comprises a reinforcing groove in said liner.

5. The combination of claim 1 wherein said liner is contained completely within said crankpin opening.

6. The combination of claim 1 wherein the outer side of said liner is plated with a metallic die lubricant and the inner side is hardened through an appropriate heat treating process.

7. The combination of claim 1 wherein said liner is formed of steel, said inner side is hardened and said connecting rod includes a bearing surface within said opening which is formed of aluminum.

8. A connecting rod bearing liner comprising: two generally semicircular liner halves formed of steel having inner bearing surfaces which are hardened, outer surfaces opposite respective said inner surfaces, and semicircular side edges which are coextensive with said inner and outer surfaces, a generally semicircular peripheral groove formed in each of said halves and spaced inwardly from said side edges, said grooves comprising peripheral depressions in respective said inner surfaces and corresponding peripheral ridges in said outer surfaces directly opposite respective said depressions, said liner halves including side flange portions extending between said groove and said side edges, said side flange portions being substantially flat in the axial direction.

9. The connecting rod liner of claim 8 wherein said grooves extend from one end to the other of respective said liner halves.

10. The connecting rod liner of claim 8 wherein said liner bearing surfaces are hardened through an appropriate heat treating process.

11. The connecting rod liner of claim 8 wherein said grooves are stamped in said liner halves.

12. The connecting rod liner of claim 8 wherein only said inner surfaces of said liner halves are hardened and said outer surfaces are plated with a metallic die lubricant.

13. The connecting rod liner of claim 12 wherein said lubricant comprises copper.

* * * * *

UNITED STATES PATENT AND TRADEMARK OFFICE
CERTIFICATE OF CORRECTION

PATENT NO. : 4,231,623
DATED : November 4, 1980
INVENTOR(S) : Vernon Ray Kaufman It is certified that error appears in the above-identified patent and that said Letters Patent are hereby corrected as shown below:

Col. 1, line 13, "hardned" should be -- hardened --.

Claim 10, Col. 6, line 27 "liner bearing" should be --inner bearing --.

Signed and Sealed this

Thirteenth Day of January 1981

[SEAL]

Attest:

SIDNEY A. DIAMOND

*Attesting Officer*    *Commissioner of Patents and Trademarks*